Patented Sept. 17, 1929

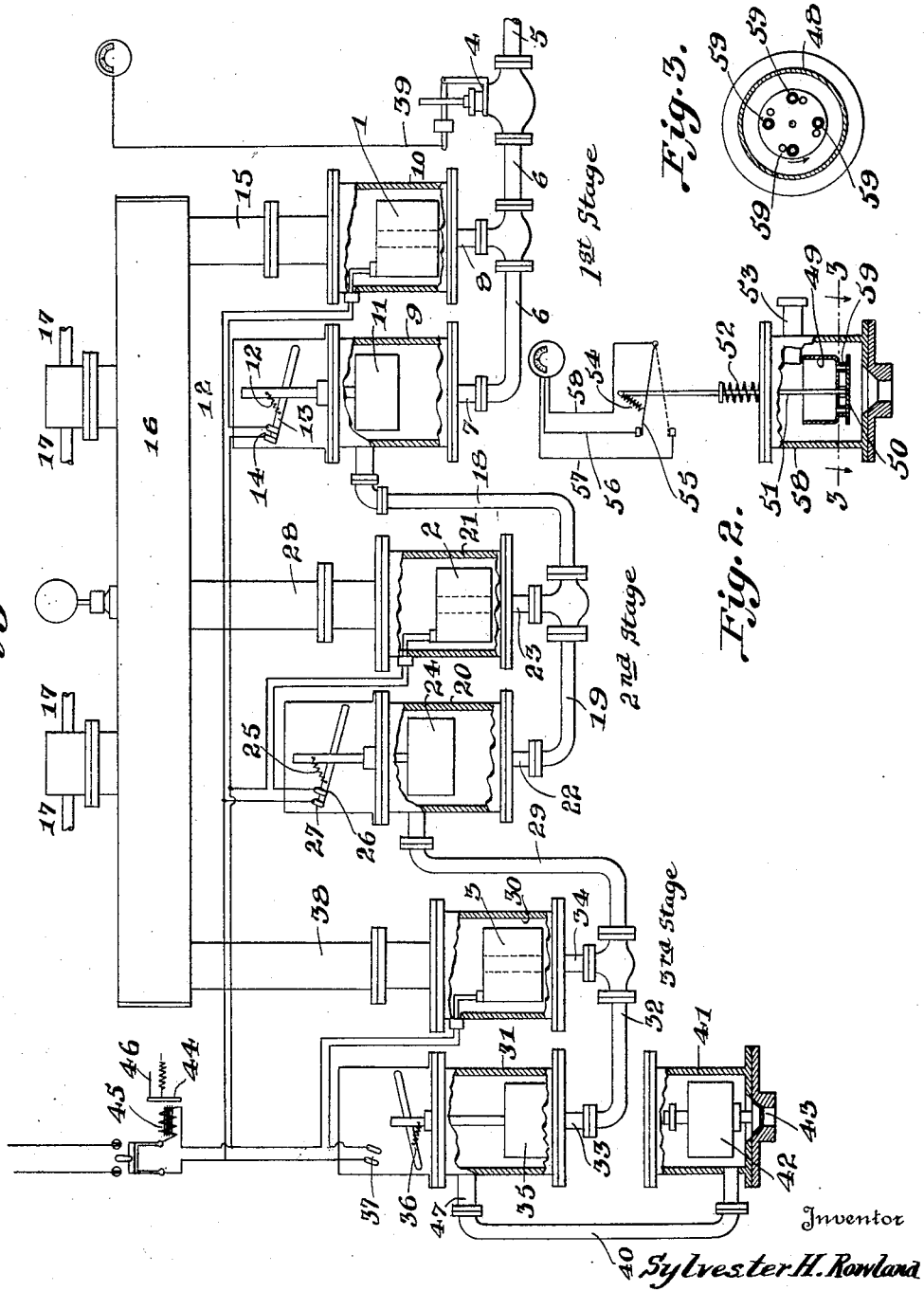

1,728,446

UNITED STATES PATENT OFFICE

SYLVESTER H. ROWLAND, OF BATH, MAINE

ELECTRIC VAPORIZER

Application filed July 30, 1927. Serial No. 209,479.

This invention relates to improvements in vaporizers, particularly in the type of apparatus or system which will provide instant automatic electric vaporizing means.

An object of this invention is to provide a more convenient and economical means for heating dwellings by electric current, through a simple and positive regulation of the electric current consumed so that no more current is provided than required during a certain period in order to maintain the desired temperature.

A further object of this invention is to provide an electric water vaporizer by means of which the heat units generated from the current consumed will be instantly converted into the best channels for distribution to the various locations and will function in such a manner that the current for the generation of these heat units and the medium for distribution may be automatically and quickly increased or decreased at a desired pressure in quantities to meet the demand, all of these objects being accomplished by a slight movement of a single lever.

A further object of this invention is to provide an electric water vaporizer comprising primarily a system consisting of a sequence of units, each unit to consist of an electric heating member to be operated only during the period of its immersion in a thin film or small quantity of water or other suitable liquid, and a float controlling a suitable mechanism for the purpose of connecting and disconnecting the heating unit with the electric current supply. The various units are arranged at suitable levels and piped in series with the city water supply through a thermostatically operated valve, the water supply or lack of supply starting or stopping the first unit and the overflow from this unit and the following unit regulating the operation of each succeeding unit in their sequence.

A broad object of this invention is to provide a system for quickly generating steam from a small amount or thin film of water in which an electric heat unit is immersed and automatically protecting the life of the unit when the water has been evaporated, and arranging and joining a sequence of electric heating units, whereby they become serially dependent for periods of operation.

Furthermore, this invention provides a means for utilizing a quantity of feed water supplied to the electric heating units for the automatic operation of the first and succeeding units.

Other objects of this invention will appear from the following detailed description of the device and as disclosed in the single sheet of drawings which is herewith made a part of this application.

In the drawings—

Figure 1 illustrates a diagrammatic view of the vaporizer according to this invention.

Figure 2 illustrates a modified form of structure which may be used for the third stage in this system instead of that disclosed in Figure 1.

Figure 3 illustrates a sectional view of Figure 2 taken along line 3—3.

This invention comprises a system or apparatus in which Figure 1 discloses a side elevation, partly in section, wherein three stages of the system are disclosed, though possibly more may be required in some plants in order to provide a more sensitive regulation.

The capacity of the electric heating unit 1 of the first stage is designed to provide for moderate weather at the desired steam pressure, with the heating unit 2 of the second stage as a balance for over-demand, and the 1 and 2 units of the first and second stages for cold weather, with the heating unit 3 of the third stage as a balance for over-demand, and heating units 1, 2 and 3 of the first, second and third stages for extreme cold.

In operation, starting from the first stage, it may be assumed that the control of a thermostatic clock regulator, shown in diagram in Figure 1, has been set at a desired temperature. The regulator moves valve 4 on the city water supply pipe 5 admitting water therefor to the pipe line 6 and through the extensions 7 and 8 into the containers 9 and 10. The water will rise to the same level in the chambers surrounding the heat unit 1 and the float member 11 in the containers 9 and 10, thereby raising the float 11. As the float 11 rises, a spring mechanism 12 of the switch 13 is actuated and when the water level is at a height which nearly submerges the heat unit 1, the switch 13 functions to snap in, thereby making contacts 14 on the circuit from the main switch of the heat unit 1.

The chamber 10 surrounding the heat unit 1 is designed to contain only a small amount of water or a quantity in keeping with the kilowatt capacity of the heat unit so that the volume of water will commence to evaporate when the circuit to this heat unit is closed and the unit sufficiently submerged. Evaporation will be continuous so long as the water level is high enough to keep the float 11 up and the switch closed and steam will rise through a pipe 15 to the common steam pipe and steam drum 16, and then to the house radiators 17, not shown.

The operation of the second stage, as disclosed in Figure 1, assumes that the water admitted to the first stage is beyond the capacity of the heat unit 1 to evaporate. The surplus water now overflows into the pipe line 18 and the pipe 19 entering containers 20 and 21 through extensions 22 and 23, the liquid rising at the same level in both the containers 20 and 21, surrounding the heat unit 2 and raising float 24, which will function to operate the spring mechanism 25 of the switch 26, thereby closing the circuit at 27 at a predetermined time before the heat unit 2 becomes submerged so that the full temperature and total submerging of the heat unit 2 will be simultaneous, the water immediately evaporating around this unit 2 sending steam through the pipe 28 and uniting with steam from the first stage to the radiators 17.

In the operation of the third stage in this system, it may be assumed that the evaporation of water by the stages 1 and 2 is not sufficient to balance the supply of water admitted by the valve 4; the overflow passes out through overflow pipe 29 to the heat and float chambers 30 and 31 through a pipe line 32, and enters the containers 30 and 31 through pipe line extensions 33 and 34, the liquid surrounding the heat unit 3 and raising the float 35 in turn actuating the switch mechanism 36 and the contacts 37. As the predetermined submerged water line surrounding the heat unit 3 is reached, the water around this unit commences to evaporate instantly and the steam passes through pipe 38 to a steam drum 16 uniting with the steam from the first and second stages to the radiators 17.

The valve 4 having been adjusted to limit the amount of water which all three units can evaporate, and the three units being designed for the maximum demand, the desired temperature will obviously be attained. The thermostatic control 39 of the valve 4 will operate to reduce the supply of water. The reduction of the feed water will be a reduction in the quantity or a stoppage of overflow from the second to third stage through pipe 29.

Owing to the fact that the third stage of this system is heating at a lower level, a continued evaporation of water in the chambers surrounding the heat unit 3 will lower the water level in both containers 30 and 31 equally, but at a rate proportional to the amount of feed water still overflowing from the second stage. The float 35 in lowering will operate switch mechanism 36, thereby opening the contacts 37 and cutting off the current to the heat unit 3 before the water has lowered to a level endangering the life of the heat unit 3.

The system is again operating on the first and second stages as clearly disclosed in Figure 1. Assuming that the overflow from the second stage has only been reduced and not stopped, also that the thermostat control had not operated to further close the valve 4, the containers 30 and 31 would again be flooded, raising the float 35 and cutting in the heat unit 3, repeating the cycle at intervals, so long as valve 4 remains unchanged. Assume that while operating the first and second stages the output be more than sufficient to maintain the required temperature, the thermostatic control 39 of the valve 4 further reduces the supply of feed water, thereby stopping the overflow between the first and second stages through the overflow pipe 18 and evaporation in container 21, lowering the level in both containers 20 and 21 causing the float 24 to operate the switch 26, thereby opening the contacts 27 and disconnecting the current to the heat unit 2 at a predetermined water level. The system is now operating on the first stage only, but should further increased demand be made by the thermostatic control 39, the valve 4 would again start the second stage by means of increasing the supply of water and overflow and when the heat was satisfactory, the second stage would be cut out by means of decreased water supply or overflow.

As further illustration of the operation of this invention, it is assumed that the heat requirements be less than that supplied by the first stage and the control operates to completely close valve 4 and as no water is admitted to this stage, the continued evaporation of water surrounding the heat unit 1 lowers the float 11 operating the switch 13 and opening the contacts 14 of the circuit to the heat unit 1 at a predetermined water level. The system is now shut down so far as the current consumption is concerned, but available to meet whatever demand is made by the thermostatic control. The controls of this type are well known in the art.

In the single pipe system shown, the returning water from condensed steam returns to the steam drum 16 and adds to the quantity in the stages if in operation, increasing the overflow to the next stage, or if not in operation, raising the level of the float until the heat unit is cut in. An overflow line 40 from the third stage is provided to the chamber or container 41 surrounding the float 42, which, on rising, opens the valve 43 and discharges surplus water. This unit is added as a preventative device to avoid an overflowing of the system while adjusting controls or failure of current. A relay 44 having a magnet 45 is in series with the current supply and has a normally closed armature which is released on current failure and its connection 46 to the control element, not shown, operates to close the valve 4 until the resumption of current. Temporary water failure eventually lowers all floats, cutting out all the units and the subsequent demand for heat, operating control, and opening the valve 4 to the fullest extent. Resumption of water supply starts all units and temporary overflow at 43.

As successful operation is the result of dependable float and switch action, the following statement will be made covering the improbable, though possible, failure of these elements. If the float or switch of the first or second stages fails on light or medium demand, the third stage would operate to supply the required steam, but should the third stage float or switch fail on maximum demand, the overflow from 43 would merely result in the waste of water. Should float 42 also fail to rise, the system would eventually operate as a hot water system with less efficiency. Should second and third stage float fail to lower or switch to open, the heat unit in that stage would continue to be surrounded with steam or condensation from the preceding unit or units, making it improbable that its temperature would rise sufficiently to endanger the life of the unit. Should the first stage float fail to lower or switch to open, and all the remaining feed water and condensation be evaporated, this unit might be in danger of burning out and may be safe-guarded by installing a unit with a high temperature internal circuit opening device, or by thermostatically opening the main circuit.

Experiments have been made which demonstrate that float 42 may be dispensed with in some instances, as very little difference in the float action is observed when the chamber surrounding the float 35 is opened to the atmosphere. A modified form of device has therefore been designed to take the place of the attachment extending from the connection 47 of the system. This structure is disclosed clearly in Figure 3 wherein a form of hydrostat is designed to temporarily control the third stage oversupply of water on a maximum demand for heat. This unit consists of a chamber or container 48 containing a cup-shaped tank 49, with its top open and the bottom portion perforated, the number of holes being selected by a rotatable disk 50 suitably mounted on the tank and having a stem 51 attached thereto, the tank 49 being normally held by the compression spring 52. The overflow pipe connection 53 extends from the container 48 at a suitable point, the upper end of the stem 51 is attached by a suitable spring 54 to the switch 55 normally making the contact 56, and when in action, contact 57.

The overflow of water through pipe connection 53 functions to fill the tank 49, its added weight compressing the spring 52 and actuating the switch 55, making the contact 57. Wires 56 and 57 and 58 connect with the thermostat control, and by the well known dual control used in furnace damper control systems as shown diagramatically in Figure 1, act to close the valve 4. In the meantime, the leakage from the tank 49 through the perforations 59 tends to lessen the weight of the tank 49 and the spring 52 raises tank 49, breaks contact 57 and makes the contact 56, thereby giving the control of valve 4 to the room thermostat, not shown. The adjustment of leakage through the openings 59 and compression spring 52 affords the time element necessary for room temperature to catch up with and balance the overflow from the third stage.

If the maximum flow through the valve 4 is limited to the quantity of water that all three stages may evaporate, the hydrostat disclosed in Figure 3 would operate only when water was admitted at a lower temperature than that at which the valve 4 was adjusted.

It is to be understood that alterations and substitutions may be made in the above disclosure including the drawings within the scope of the appended claims without affecting the merits of this invention.

What I claim is:

1. In a liquid vaporizing system, means for generating vapor from a quantity of liquid comprising a plurality of electric heat units suitably submerged within the liquid, the electric heat units being arranged and joined in sequence in such a manner that they become serially dependent for periods of operation, means for utilizing the quantity of liquid supplied to the electric heat units for the automatic operation of certain of the units.

2. In an electric liquid vaporizing system, a plurality of electric heating units arranged in sequence and at suitable levels and connected in open communication in series with a liquid supply through a thermostatically operated valve, the water supply or lack of supply starting or stopping the first unit and the overflow from this and the following units regulating the operation of each succeeding unit.

3. In an electric liquid vaporizing system, a plurality of electric heating units arranged in sequence and at suitable levels and connected in open communication in series with a liquid supply through a thermostatically operated valve, the water supply or lack of supply starting or stopping the first unit and the overflow from this and the following units regulating the operation of each succeeding unit, each unit constructed to operate only during the period of its immersion in a small amount of water, and a container for the water, a float within the container controlling a suitable mechanism for connecting and disconnecting the heating unit with the current supply.

4. In an electric heating system, means for automatically regulating the amount of current consumed and distributing the current to various locations as required, comprising a plurality of heat units in open communication with each other automatically operated by the movement of a single lever.

5. In an electric heating system, means for automatically regulating the amount of current consumed and distributing the current to various locations as required, comprising a plurality of heat units in open communication with each other automatically operated by the movement of a single lever, each unit consisting of a pair of containers for receiving a liquid.

6. In an electric heating system, means for automatically regulating the amount of current consumed and distributing the current to various locations as required, comprising a plurality of heat units in open communication with each other automatically operated by the movement of a single lever, each unit consisting of a pair of containers for receiving a liquid, one of the containers having an electric heating element therein, the other receptacle being provided with a float.

7. In an electric heating system, means for automatically regulating the amount of current consumed and distributing the current to various locations as required, comprising a plurality of heat units in open communication with each other automatically operated by the movement of a single lever, each unit consisting of a pair of containers for receiving a liquid, one of the containers having an electric heating element therein, the other receptacle being provided with a float, a switch controlled by the float for connecting or disconnecting the current.

8. In an electric heating system, means for automatically regulating the amount of current consumed and distributing the current to various locations as required, comprising a plurality of heat units in open communicataion with each other automatically operated by the movement of a single lever, each unit consisting of a pair of containers for receiving a liquid, one of the containers having an electric heating element therein, the other receptacle being provided with a float, a switch controlled by the float for connecting or disconnecting the current, the units being arranged at suitable levels in series.

9. In an electric heating system, means for automatically regulating the amount of current consumed and distributing the current to various locations as required, comprising a plurality of heat units in open communication with each other automatically operated by the movement of a single lever, each unit consisting of a pair of containers for receiving a liquid, one of the containers having an electric heating element therein, the other receptacle being provided with a float, a switch controlled by the float for connecting or disconnecting the current, the units being arranged at suitable levels in series, and in open communication with a liquid supply line.

10. In an electric heating system, means for automatically regulating the amount of current consumed and distributing the current to various locations as required, comprising a plurality of heat units in open communication with each other automatically operated by the movement of a single lever, each unit consisting of a pair of containers for receiving a liquid, one of the containers having an electric heating element therein, the other receptacle being provided with a float, a switch controlled by the float for connecting or disconnecting the current, the units being arranged at suitable levels in series, and in open communication with a liquid supply line, the liquid supply line being provided with an automatically operated valve.

11. In an electric heating system, means for automatically regulating the amount of current consumed and distributing the current to various locations as required, comprising a plurality of heat units in open communication with each other automatically operated by the movement of a single lever, each unit consisting of a pair of containers for receiving a liquid, one of the containers having an electric heating element therein, the other receptacle being provided with a float, a switch controlled by the float for connecting or disconnecting the current, the units being arranged at suitable levels in series, and in open communication with a liquid supply line, the liquid supply line being provided with an automatically operated valve, for admitting liquid to one unit, the overflow from this unit and the other units regulating the operation of each succeeding unit in the series.

12. In a liquid vaporizing system, means for generating vapor from a quantity of liquid, comprising a plurality of electric heat units suitably submerged within the liquid, and means for utilizing the quantity of liquid supplied to the electric heat units for the automatic operation of certain of the units.

13. In a liquid vaporizing system, means for generating vapor from a quantity of liquid, comprising a plurality of electric heat units suitably submerged within the liquid, means for utilizing the quantity of liquid supplied to the electric heat units for the automatic operation of certain of the units, and means for automatically regulating the amount of current consumed and distributing the current to various locations as required.

In testimony whereof I affix my signature.

SYLVESTER H. ROWLAND.